United States Patent [19]

Huang

[11] Patent Number: 4,549,070
[45] Date of Patent: Oct. 22, 1985

[54] COMBINED CIGARETTE AND CHART/MAP LIGHTER

[75] Inventor: Jiann-Yu Huang, Gloversville, N.Y.

[73] Assignee: N. A. Taylor Company, Inc., Gloversville, N.Y.

[21] Appl. No.: 677,739

[22] Filed: Dec. 3, 1984

[51] Int. Cl.$^4$ ............................................. F23Q 7/22
[52] U.S. Cl. ..................................... 219/269; 219/220; 219/265; 219/267; 362/92
[58] Field of Search ............... 219/260, 220, 264, 265, 219/267, 269, 512; 362/92, 253; 307/157; 432/306

[56] References Cited

U.S. PATENT DOCUMENTS

| | | | |
|---|---|---|---|
| 2,243,639 | 5/1941 | Lehmann | 219/269 |
| 2,270,564 | 1/1942 | Schroeder | 219/269 X |
| 2,473,890 | 6/1949 | Kroll et al. | 432/306 |
| 2,514,171 | 7/1950 | Waltner, Jr. | 219/269 |
| 2,630,517 | 3/1953 | Hiscar | 219/269 X |
| 2,630,539 | 3/1953 | Sinko et al. | 307/157 |
| 2,648,758 | 8/1953 | Kroll et al. | 219/269 |
| 2,784,290 | 3/1957 | Ashton | 219/269 X |
| 3,502,887 | 3/1970 | Erickson et al. | 219/269 X |
| 3,925,655 | 12/1975 | Mattis | 362/253 |
| 4,270,038 | 5/1981 | Warihashi | 219/269 |

Primary Examiner—Volodymyr Y. Mayewsky
Attorney, Agent, or Firm—Cushman, Darby & Cushman

[57] ABSTRACT

A combined cigarette and chart/map lighter includes a elongated plug body which is adapted to cooperate with a socket connected to a source of electrical energy. An ignitor coil and cup are formed at a first end of the plug body, and a lamp socket, for receipt of a light bulb, is disposed interiorly of the plug body at a central portion of the plug body. A removable cap is formed at the second end of the plug body. A leaf spring electrical contact is provided within the plug body and is biased into engagement with a ground formed by the interior shell of the plug body. A cam follower is formed at the end of the leaf spring contact. A plastic generally U-shaped reciprocal element has linear cams formed at the free ends of each of the legs of the U, the linear cams capable of engaging the leaf spring cam follower and moving the leaf spring out of contact with the ground. When the leaf spring is out of contact with ground and the plug is in operative association with the socket, a light bulb received by the lamp socket is illuminated and light shines through an opening formed in the plug body between the lamp socket and the second end. When the leaf contact is in engagement with ground and the plug engages the socket, then the ignitor coil heats up.

20 Claims, 5 Drawing Figures

COMBINED CIGARETTE AND CHART/MAP LIGHTER

BACKGROUND AND SUMMARY OF THE INVENTION

The invention relates to a device that may be utilized as a cigarette lighter, or as a light source for illuminating charts, maps or the like. The invention is particularly adapted for use on boats or in automobiles, and is adapted to be used with a conventional socket for cigarette lighters and the like that are presently commonly provided on boats and in automobiles.

The invention is particularly advantageous in that it is easy and simple to construct, easy and simple to operate, and allows for ready replacement of the light source. The invention positively provides switching between a first condition in which, upon actuation, an electric resistance heating element is heated to provide a heat source for lighting of a cigarette or the like, and a second position in which the electric light illuminates an area adjacent the device.

The most basic component of the device according to the invention comprises a plug body which is elongated in a first dimension, and is adapted to cooperate with a conventional socket which is connected up to a source of electricity. Typically, the socket would be connected up to the battery of a boat or automobile.

The plug body comprises an ignitor coil and a cup mounted at a first end thereof, and a light bulb socket mounted within the plug body (which is hollow) at a central portion thereof. Means are provided defining an opening in the plug body adjacent the light bulb so that light from a bulb received by the light bulb socket shines exteriorly of the plug body, to illuminate the immediately surrounding area.

At the second end of the plug body preferably a removable cap is provided. Internal screw threads of the cap can cooperate with external screw threads on the plug body. A reciprocal element is also provided adjacent the second end of the plug body. The reciprocal element is mounted within the plug body (and cap) for reciprocal movement in the first dimension from a first position, wherein when the plug body is in operative association with the socket the ignitor coil heats up, to a second position wherein, when the plug body is in operative association with socket, the light bulb received by the lamp socket is illuminated. A switching action is preferably effected by utilizing a leaf spring contact operatively connected to the ignitor coil, and normally biased into engagement with a ground element, which comprises an interior surface of the hollow plug body. A linear cam is formed on a portion of the reciprocal element, and the linear cam engages a cam follower portion of the leaf spring to move the leaf spring from a position in contact with the ground element, to a position wherein it is not in contact with the ground element, but rather is in contact with a portion of the reciprocal element, which is of electrically insulating material.

The reciprocal element preferably comprises a resilient piece of plastic which has a generally U-shape. The two legs of the U preferably are symmetrical, and each has a linear cam formed at the free end thereof, and an upstanding portion (extending in a second dimension perpendicular to said first dimension) extending outwardly from the middle of the legs. The cross-portion of the U is preferably circular in plan and is accessible through an opening formed in the end cap. The upstanding portions are guided by slots formed on the exterior of the plug body, and extending in the first dimension.

It is the primary object of the present invention to provide a simple to construct and utilize, and effective, combination cigarette lighter and map/chart lighter. This and other objects of the invention will become clear from an inspection of the detailed description of the invention, and from the appended claims.

DETAILED DESCRIPTION OF THE DRAWINGS

Figure 5:
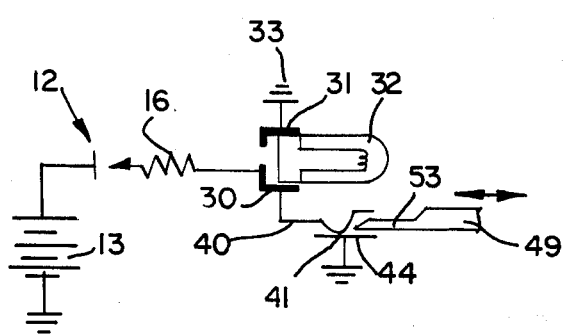
FIG. 5 is an electrical schematic of the device of FIG. 1.

The device according to the present invention comprises a plug body, shown generally by the reference numeral 10 in the drawings, adapted to cooperate with a conventional socket, shown generally by reference numeral 12 in the drawings. The socket 12 is usually stationarily mounted within a boat, automobile, or the like, and is connected up to the battery 13 (see FIG. 5) of the vehicle. The socket includes a terminal 14, and flexible stationary contact members 15 which are of a bimetallic material so as to be affected by heat. Details of the socket are disclosed in U.S. Pat. Nos. 2,784,290 and 2,531,901.

Mounted at a first end of the plug body 10 (which is elongated in the dimension A) is an ignitor coil 16, and cup 17. The cup 17 serves to engage the bimetallic contacts 15. The ignitor coil 16 is connected at the outer end thereof to the cup 17, and at the inner end thereof to a conductive stud 18. The coil 16 is an electrical resistance heating element which can be heated up so as to light a cigarette or the like when it is brought in contact with the cigarette or the like. A stud 18 is connected up to spring jaws 19, which in turn engage conductive pin 20. A coil spring 21 acts on surface 22 and insulating washer 23 to normally bias the body 10 to an outward position. The details of the ignitor coil, and like components, of the device according to the invention are shown and described in U.S. Pat. No. 2,784,290, the disclosure of which is hereby incorporated by reference herein.

Disposed at a central location of the plug body 10, within the hollow interior of the plug body 10, is a lamp socket. The lamp socket preferably is provided by first and second bulb holding contacts 30, 31. These contacts are adapted to receive a conventional small electric bulb 32, which is removably mounted by the contacts 30, 31 and in electrical contact with the ignitor coil 16 therethrough. As seen most clearly in the schematic of FIG. 5, the bulb contact 31 is connected to ground 33, which preferably comprises the metal interior surface of the plug body 10.

In order that light from the light bulb 32 can illuminate the surrounding area, means are provided defining a cut-out 35 in the plug body 10 adjacent the bulb 32 received by the lamp socket. Light from the bulb 32 shines out the opening 35, to illuminate the surrounding area. A map, chart, or the like can be placed below the opening 35, and is quite well illuminated by light coming through the opening 35.

Figure 2:
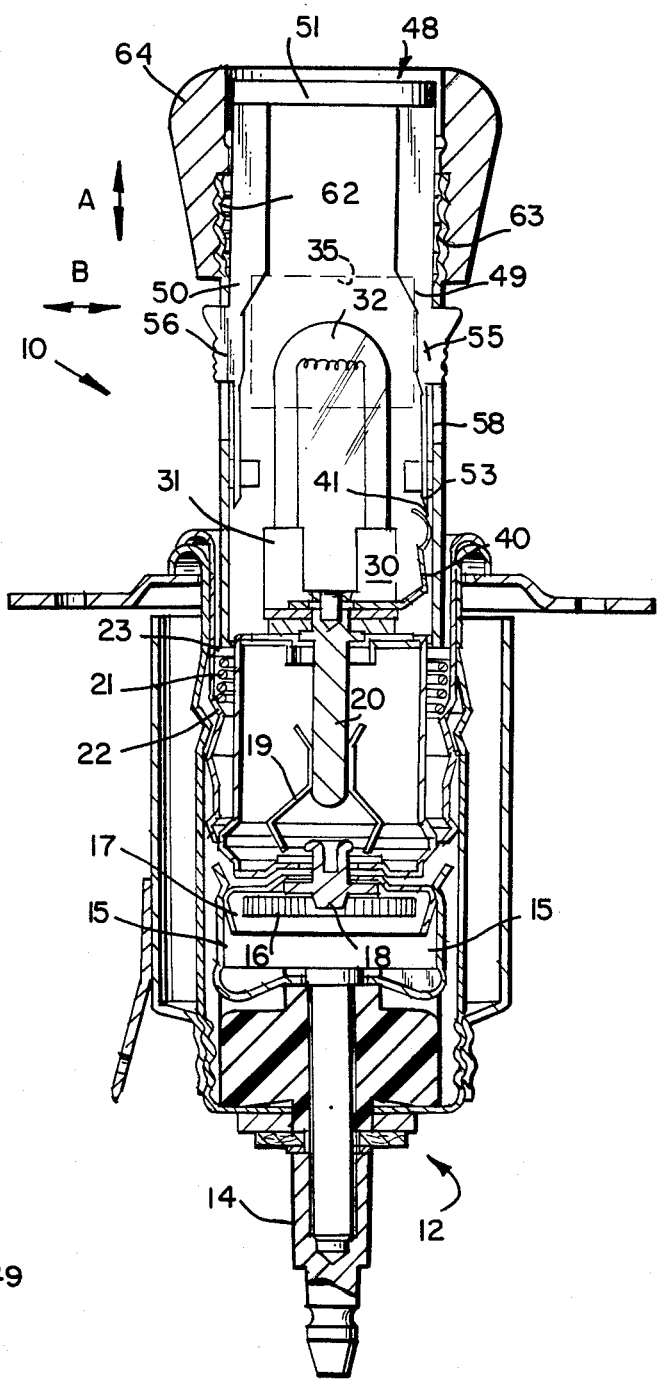
FIG. 2 is a side cross-sectional view of the device of FIG. 1 shown in the bulb-off position thereof, and the cup out of engagement with the socket.
Figure 3:
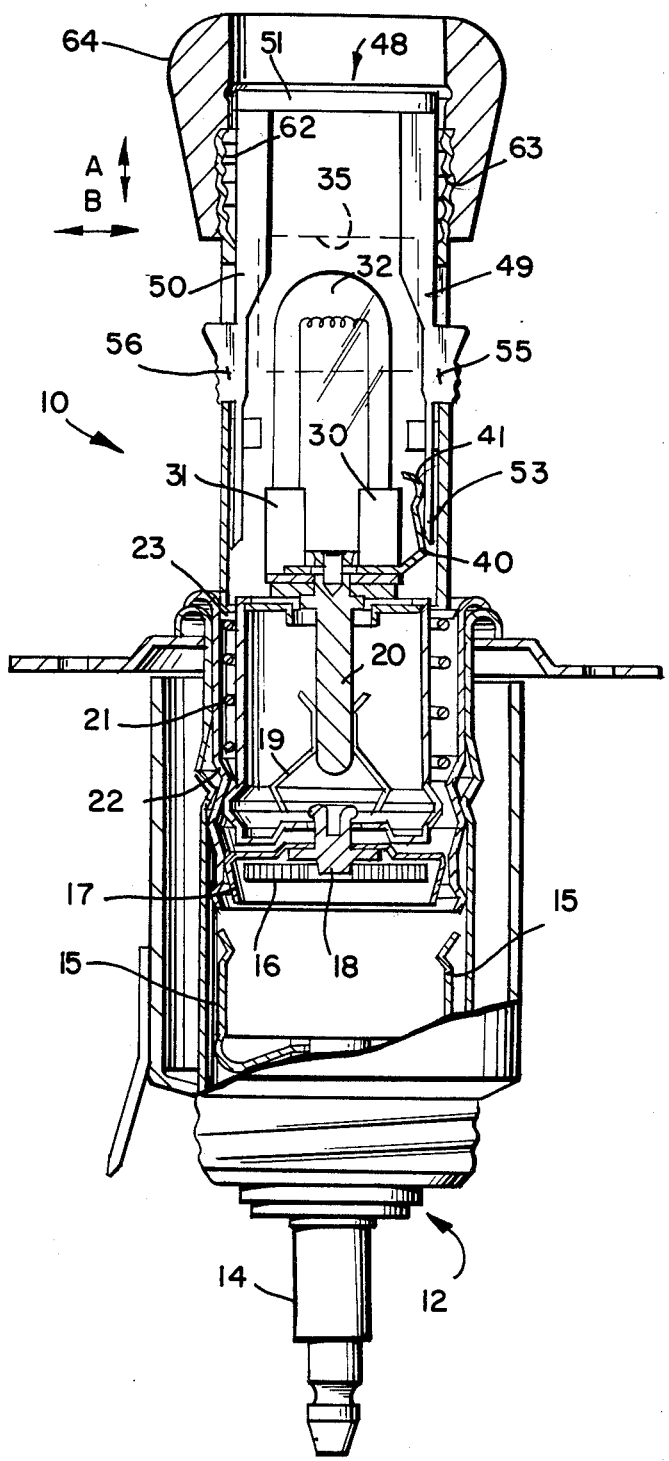
FIG. 3 is a view like that of FIG. 2 only shown in the bulb-on position thereof, and with the cup in engagement with the socket.

Also at a central portion of the plug body 10 is electrical contact 40 as illustrated in FIGS. 2 and 3. The electrical contact 40 preferably comprises a leaf spring electrically connected, and mechanically cantilevered, at one end thereof to the bulb contact 30, and having a cam follower portion 41 at the free end thereof. Due to its construction, the leaf spring 40 is normally biased into contact with a ground element 44 (see FIGS. 2 and 5), which—like the ground 33—comprises an interior surface of the metal body 10.

Figure 4:
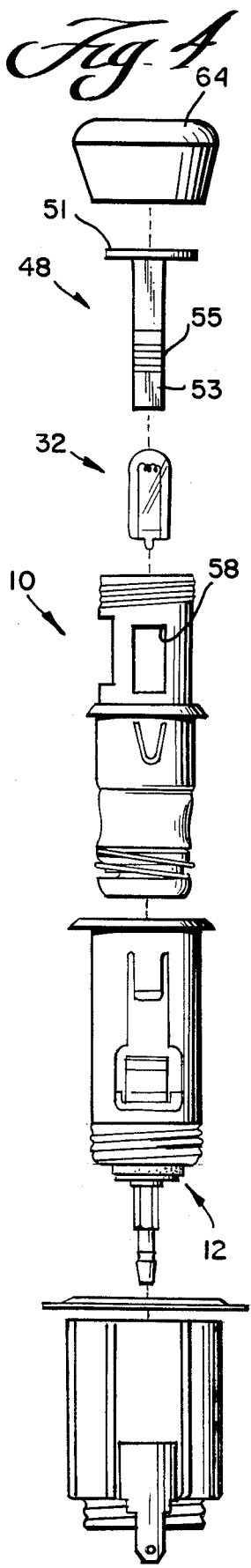
FIG. 4 is a side exploded view of the device of FIG. 1.

A reciprocal element, shown generally by reference numeral 48, is mounted within the body 10 for reciprocal movement in dimension A. As illustrated in FIGS. 2 through 4 in particular, the reciprocal element 48 preferably comprises an integral single piece of plastic, or like electrically non-conductive material having a generally U-shape. The U-shape includes first and second legs 49, 50, connected together by a cross-portion 51. For at least one of the legs (i.e. the leg 49) a linear cam 53 is formed at the free end (the end opposite the connection portion 51). The linear cam 53 is adapted to engage the cam follower 41 of the leaf spring 40 and cam it out of contact with the ground element 44 (as shown in FIG. 3). With the insulating material of the reciprocal element 48 disposed between the leaf spring contact 40 and the ground element 44, light bulb 32 will light when the cap 17 is in operative association with the socket contacts 15.

Figure 1:
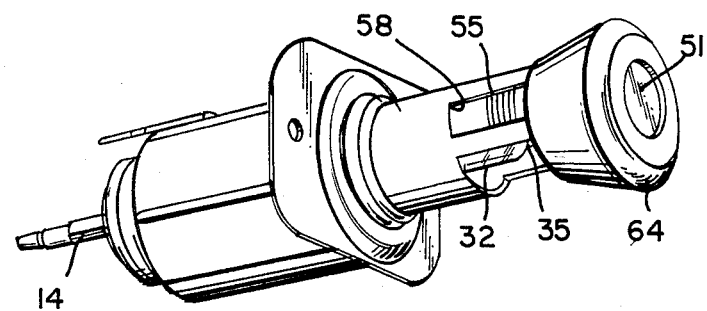
FIG. 1 is a perspective view of an exemplary device according to the present invention.

Extending outwardly in a dimension B, perpendicular to the dimension A, from each of the legs 49, 50 is an upstanding portion 55, 56, respectively. The upstanding portions 55, 56 have uneven surfaces and are adapted to be engaged by fingers of an operator to move the reciprocal element 48 from the position shown in FIG. 3 back to the position shown in FIG. 2. Also, the upstanding portions 55, 56 each extend through one of two parallel slots (such as slot 58 shown in FIG. 1), which guide the reciprocal element 40 during its reciprocal movement in dimension A. The slots preferably are each formed approximately 90° from the center line of the opening 35, on either side thereof, as can be seen in FIGS. 2 and 3. Preferably both of the legs 49, 50 are identical, including having linear cams 53 formed at the free end thereof, so that irrespective of the orientation of the element 53 when it is inserted into the plug body 10 it will be capable of camming the leaf spring 40 over a part of the length of travel thereof.

At the second end of the hollow body 10, opposite the end containing the ignitor coil 16, the body 10 is preferably open. The opening at this end is formed so that it is circular in cross-section, having a diameter approximately equal to the diameter of the cross-portion 51, which is circular in plan.

At the second end of the plug body 10, preferably external screw threads 62 are provided. They cooperate with corresponding screw threads 63 formed internally of an end cap 64 which closes off the second end of the plug body 10. The end cap 64 is moved into operative association with the body 10 by screwing the screw threads 62, 63 together, and when it is desired to remove the bulb 32, or to facilitate removal of the reciprocal element 48, the cap 64 is unscrewed.

While removal of cap 64 facilitates removal of the reciprocal element 48, element 48 also can be removed even with the cap 64 in place. Whenever removal of the element 48 is desired, an operator presses inwardly on both the upstanding portions 55, 56 at the same time so that the legs 49, 50 move toward each other until the upstanding portions 55, 56 are both completely within the hollow interior of the body 10, and then a force is applied to them in a right hand direction as viewed in FIGS. 2 and 3, so that the cross-portion 51 extends outwardly with the cap 64. Then the cross-portion 51 is grasped and pulled outwardly to remove the element 48 entirely.

Operation

The plug 10 is assembled by placing a light bulb 32 through the opening at the second end of the body 10, until the light bulb 32 engages the contacts 30, 31. The legs 49, 50 of the reciprocal element 48 are moved toward each other, and moved into the interior of the body 10 and pushed inwardly until the upstanding portions 55, 56 are received by the slots in the body 10 (e.g. slot 58), with a slight rotational movement being imparted to the element 48 by the operator if that is necessary in order to properly align the upstanding portions 55, 56 with the slots. The end cap 64 is screwed onto the second end of the plug body 10, utilizing cooperating threads 62, 63, and the device 10 is ready to be used.

Normally the device 10 is received within the socket 12 loosely. However, when it is desirable to actuate the ignition coil 16, the operator pushes on the end cap 64, exerting an inward force which moves the cap 17 into operative association with the socket contacts 15 (see FIG. 2). The spring 21 is compressed in the process. Current then flows from the battery 13 (see FIG. 5) through the terminal 14, contacts 15 to the end cap 17, through the ignitor coil 16, stud 18, contact elements 19, post 20, contact 30, leaf spring 40, and through ground element 44 to ground. After the ignitor coil 16 is heated sufficiently, the heat therefrom causes the bimetallic contacts 15 to separate slightly, the spring 21 exerts a force moving the plug body 10 outwardly away from the socket 12, and the cap 17 is detached from the contact elements 15 (as shown for elements 15, 17 in FIG. 3). The operator may then remove the body 10 completely from the socket 12 and place the ignitor coil 16 into contact with a cigarette or the like.

When it is desired that the device be utilized to illuminate charts, maps, or the like, the operator pushes on the cross-piece 51 of element 48 so that the element 48 moves inwardly with respect to the end cap 64, to the position illustrated in FIG. 3. As it moves inwardly the linear cam 53 engages the cam follower 41 and moves it out of contact with the ground element 40, so that the linear cam portion 53 of the reciprocal element 48 is between the contact 40 and the ground element 44, preventing completion of an electrical circuit therethrough. Then by engaging the end cap 64, the entire structure is moved inwardly so that the cap 17 engages the socket contacts 15 (as shown for elements 15, 17 in FIG. 2). When this happens, current flows through terminal 14 from the battery 13, through the cap 17, ignitor coil 16, stud 18, elements 19, and post 20, through the lamp contacts 30 and 31 (thereby lighting the lamp 32), to ground 33. Light from the light bulb 32 shines outwardly through opening 35 in the plug body 10, illuminating the desired area. When it is no longer desired to utilize the light, the operator grasps the upstanding portions 55 and 56 and pulls to the right (in FIGS. 2 and 3) on the element 48, moving it from the position illustrated in FIG. 3 to the position illustrated in FIG. 2. The end cap 64 is also grasped to move the entire plug body 10 to the non-contact position with respect to the socket elements 15 (as illustrated in FIG. 3).

It will thus be seen that according to the present invention a simple yet effective device has been provided which may function both as a cigarette lighter, and for illumination of a light bulb to facilitate chart reading, or the like. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A device for providing a source of heat for the heating of a cigarette or the like, or for providing a source of illumination, for use in combination with a stationary socket operatively connected to a source of electrical energy, said device comprising:
    a plug body elongated in a first dimension;
    an igniter coil and cup mounted at a first end of said plug body;
    a light bulb receiving socket mounted in a central portion of said plug body;
    means defining an opening in said plug body adjacent said light bulb socket so that light from a bulb in the socket may shine out said opening to illuminate an area adjacent thereto;
    a cap removably mounted to the second end of said plug body, opposite said first end thereof; and
    a reciprocal element, reciprocal in said first dimension, mounted within said plug body between said light bulb socket and said removable cap, said reciprocal element guided for reciprocal movement within said cap and body and comprising means for providing illumination of a light bulb received within said light bulb socket, when in a first position thereof, or for providing electric resistance heating of said igniter coil when in a second position thereof.

2. A device as recited in claim 1 further comprising an electrical contact biased into engagement with a ground; and wherein said reciprocal element is of electrical insulating material and includes a linear cam portion thereof for movement between said electrical contact and ground in said first position of said reciprocal element, and allowing contact between said electrical contact and said ground element in said second position of said reciprocal element.

3. A device as recited in claim 2 wherein said electrical contact comprises a leaf spring contact having a free end portion thereof formed as a linear cam follower for operatively engaging said linear cam portion of said reciprocal element.

4. A device as recited in claim 3 wherein said reciprocal element comprises a substantially U-shaped element having first and second legs and a cross-portion, at least one of said legs having said linear cam portion formed at the end thereof remote from said cross-portion.

5. A device as recited in claim 4 wherein said reciprocal element cross-portion is substantially circular in plan and is accessible through an opening formed in the end of said removable cap.

6. A device as recited in claim 5 wherein said plug body includes means for guiding said reciprocal element, comprising first and second slots formed in the exterior thereof and parallel to said dimension of elongation; and wherein each of said legs of said reciprocal element includes an upstanding portion which, in use, projects through one of said slots and is engageable by an operator from the exterior of said slot.

7. A device as recited in claim 6 wherein said U-shaped reciprocal element is formed of a plastic material so that said legs may be deformed inwardly toward each other so that said upstanding portions on the legs thereof are disposed completely within said plug body, and said U-shaped member may be removed from said plug body through said opening in the end of said removable cap.

8. A device as recited in claim 4 wherein said plug body includes means for guiding said reciprocal element, comprising first and second slots formed in the exterior thereof and parallel to said dimension of elongation; and wherein each of said legs of said reciprocal element includes an upstanding portion which, in use, projects through one of said slots and is engageable by an operator from the exterior of said slot.

9. A device as recited in claim 1 further comprising exterior threads formed at said second end of said plug body, and interior threads formed on said removable cap, said threads cooperating to provide for removability of said cap from said plug body.

10. A device for providing a source of heat for the heating of a cigarette or the like, or for providing a source of illumination, for use in combination with a stationary socket operatively connected to a source of electrical energy, said device comprising:
    a plug body elongated in a first dimension;
    an igniter coil and cup mounted at a first end of said plug body;
    a light bulb receiving socket mounted in a central portion of said plug body;
    means defining an opening in said plug body adjacent said light bulb socket so that light from a bulb in the socket may shine out said opening to illuminate an area adjacent thereto;
    a reciprocal element guided for reciprocal movement in said first dimension within said plug body, and accessible from adjacent a second end of said plug body, opposite said first end; and
    an electrical contact biased into engagement with a ground; and
    wherein said reciprocal element is of electrical insulating material and includes a linear cam portion thereof for movement between said electrical contact and ground in said first position of said reciprocal element, and allows contact between said electrical contact and said ground element in said second position of said reciprocal element.

11. A device as recited in claim 10 wherein said electrical contact comprises a leaf spring contact having a free end portion thereof formed as a linear cam follower for operatively engaging said linear cam portion of said reciprocal element.

12. A device as recited in claim 11 wherein said reciprocal element comprises a substantially U-shaped element having first and second legs and a cross-portion, at least one of said legs having said linear cam portion formed at the end thereof remote from said cross-portion.

13. A device as recited in claim 12 wherein said plug body includes means for guiding said reciprocal element, comprising first and second slots formed in the exterior thereof and parallel to said dimension of elongation; and wherein each of said legs of said reciprocal element includes an upstanding portion which, in use, projects through one of said slots and is engageable by an operator from the exterior of said slot.

14. A device as recited in claim 10 wherein said reciprocal element comprises a substantially U-shaped element having first and second legs and a cross-portion, at least one of said legs having said linear cam portion formed at the end thereof remote from said cross-portion.

15. A device as recited in claim 14 wherein said plug body includes means for guiding said reciprocal element, comprising first and second slots formed in the exterior thereof and parallel to said dimension of elongation; and wherein each of said legs of said reciprocal element includes an upstanding portion which, in use, projects through one of said slots and is engageable by an operator from the exterior of said slot.

16. A device as recited in claim 10 wherein said reciprocal element includes an upstanding portion, upstanding in a second dimension perpendicular to said first dimension; and wherein guiding of said reciprocal element in said body is provided by means defining a slot in said body parallel to said first dimension, said upstanding portion extending into said slot and being guided in reciprocal movement thereby.

17. A device as recited in claim 10 wherein said reciprocal element comprises a generally U-shaped element having legs and a cross-portion, and wherein said legs are substantially identical each including a linear cam formed at the free end thereof, and an upstanding portion extending generally perpendicular to said first dimension; said reciprocal element formed from an integral piece of plastic material.

18. A device for providing a source of heat for the heating of a cigarette or the like, or for providing a source of illumination, for use in combination with a stationary socket operatively connected to a source of electrical energy, said device comprising:
a plug body elongated in a first dimension;
an igniter coil and cup mounted at a first end of said plug body;
a light bulb receiving socket mounted in a central portion of said plug body;
means defining an opening in said plug body adjacent said light bulb socket so that light from a bulb in the socket may shine out said opening to illuminate an area adjacent thereto;
a reciprocal element mounted for guided linear movement in said first dimension within said plug body, said reciprocal element accessible from a second end of said plug body, opposite said first end thereof; and said reciprocal element comprising:
a generally U-shaped element having legs and a cross-portion, and wherein said legs are substantially identical, each including a linear cam formed at the free end thereof, and an upstanding portion extending generally perpendicular to said first dimension; said reciprocal element formed from an integral piece of plastic material.

19. A device as recited in claim 18 further comprising means defining a pair of slots in the exterior of said plug body between said second end and said socket, said slots parallel to said first dimension, and, in use, one of said upstanding portions of said reciprocal element extending through each of said slots.

20. A device as recited in claim 19 wherein said plug body is open at said second end thereof, defining a generally circular opening; and wherein said cross-portion of said reciprocal element is circular in plan, having substantially the same diameter as the diameter of said circular opening in said plug body, and accessible through said opening in said plug body.

* * * * *